United States Patent
Morscheck (10) Patent No.: US 7,217,214 B2
(45) Date of Patent: *May 15, 2007

(54) CONTINUOUSLY VARIABLE STEPPED TRANSMISSION

(75) Inventor: Timothy John Morscheck, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/221,134

(22) Filed: Sep. 7, 2005

(65) Prior Publication Data

US 2006/0003862 A1    Jan. 5, 2006

Related U.S. Application Data

(63) Continuation of application No. 10/695,314, filed on Oct. 28, 2003, now Pat. No. 6,986,725.

(60) Provisional application No. 60/423,085, filed on Nov. 1, 2002.

(51) Int. Cl.
*F16H 37/02* (2006.01)

(52) U.S. Cl. .................. 475/211; 475/207; 475/215; 74/665 B; 74/665 G; 74/665 R (58) Field of Classification Search ............... 475/207, 475/210, 211, 212, 214, 215; 74/665 A, 74/665 B, 665 F, 665 G, 665 R
See application file for complete search history.

(56) References Cited

U.S. PATENT DOCUMENTS

| 2,076,928 A | 4/1937 | Witmer |
| 3,861,485 A | 1/1975 | Busch |
| 4,599,916 A | 7/1986 | Hirosawa |
| 4,624,153 A | 11/1986 | Itoh et al. |
| 4,644,820 A | 2/1987 | Macey et al. |

(Continued)

FOREIGN PATENT DOCUMENTS

DE    294868    10/1916

(Continued)

OTHER PUBLICATIONS

Takashi Imanishi and Shinji Miyata, "Development of the Next-Generation Half-Toroidal CVT", NSK, Motion & Control No. 14 (May 2003), pp. 20-24.

(Continued)

*Primary Examiner*—David D. Le
(74) *Attorney, Agent, or Firm*—Kevin M. Hinman (57) ABSTRACT

A continuously variable transmission for use with motor vehicles includes an ECU, an automated gear unit, a variator, an input gear set, an input fixed ratio element and an output fixed ratio element. The automated gear unit has multiple gear ratios and engages one of the gear ratios responsive to commands from the ECU. The variator varies a ratio of torque between its input and output shafts responsive to commands from the ECU. The variator output shaft connected to the gear unit input shaft. The input gear set is connected to the variator input shaft. The input fixed ratio element reduces torque from the input gear set to the variator, and is disposed between the input gear set and the variator input shaft. The output fixed ratio element increases the torque from the variator, and is disposed between the variator output shaft and the gear unit input shaft.

4 Claims, 10 Drawing Sheets

U.S. PATENT DOCUMENTS

| | | |
|---|---|---|
| 4,672,863 A | 6/1987 | Itoh et al. |
| 4,793,217 A | 12/1988 | Morisawa et al. |
| 4,857,389 A | 8/1989 | Wheeler |
| 4,864,889 A | 9/1989 | Sakakibara et al. |
| 4,936,165 A | 6/1990 | Doyle et al. |
| 5,055,094 A | 10/1991 | Cataldo |
| 5,121,936 A | 6/1992 | Cowan |
| 5,167,591 A | 12/1992 | Cowan |
| 5,215,323 A | 6/1993 | Cowan |
| 5,279,527 A | 1/1994 | Crockett |
| 5,401,221 A | 3/1995 | Fellows |
| 5,477,382 A | 12/1995 | Pernick |
| 5,495,912 A | 3/1996 | Gray, Jr. |
| 5,643,121 A | 7/1997 | Greenwood |
| 5,645,506 A | 7/1997 | Mieczko |
| 5,669,846 A | 9/1997 | Moroto et al. |
| 5,887,674 A | 3/1999 | Gray, Jr. |
| 5,904,633 A | 5/1999 | Lee |
| 5,980,414 A | 11/1999 | Larkin |
| 6,001,042 A | 12/1999 | Raney |
| 6,042,498 A | 3/2000 | Kashiwase |
| 6,056,661 A | 5/2000 | Schmidt |
| 6,210,298 B1 | 4/2001 | Baur et al. |
| 6,293,888 B1 | 9/2001 | Moon |
| 6,447,422 B1 | 9/2002 | Haka |
| 6,986,725 B2 * | 1/2006 | Morscheck .................. 475/210 |

FOREIGN PATENT DOCUMENTS

| | | |
|---|---|---|
| DE | 3424856 A1 | 7/1984 |
| DE | 19631216 A1 | 8/1996 |
| DE | 19930013 A1 | 6/1999 |
| EP | 0 541 771 | 5/1993 |
| EP | 0809044 A2 | 5/1997 |
| JP | 60196463 A | 10/1985 |
| WO | WO-94-10483 | 5/1994 |
| WO | WO-9534772 | 12/1995 |
| WO | WO-0043696 | 7/2000 |
| WO | WO 01-69106 A | 9/2001 |
| WO | WO 02-057107 A | 7/2002 |

OTHER PUBLICATIONS

Mark Kmicikiewicz, Ben Cowan, Philippe Argues, "Continuously Variable Power Split Transmission" -Presented at Internal Congress on Continuously Variable Transmission CVT'99 in Eindhoven, The Netherlands, Sep. 16-17, 1999.

Kouichi Masuzawa, Ken Ichiryu—Tokyo University Of Technology, Basic Study on Input Split Type, Presented at Fifth International Conference on Fluid Power Transmission and Control (ICFP2001), Apr. 3-5, 2001, Hangzho, China.

Christian Lauinger, Martin Vornehm, Andreas Englisch, "500 Nm CVT", 7th LuK Symposium, Apr. 11-12, 2002, pp. 91-103.

* cited by examiner

—— IS  —— VARIATOR IS  — — VARIATOR OS  --- CVT OS

CONTINUOUSLY VARIABLE STEPPED TRANSMISSION

RELATED APPLICATIONS

This is a continuation of application U.S. Ser. No. 10/695,314 filed on Oct. 28, 2003, which is now U.S. Pat. No. 6,986,725 which claims the benefit of U.S. Provisional Application No. 60/423,085, filed Nov. 1, 2002 entitled "Continuously Variable Stepped Transmission", which is incorporated herein by reference in its entirety.

FIELD OF THE INVENTION

The present invention relates to multi-speed transmissions used in combination with continuously variable transmissions or CVTs. In particular, the present invention relates to the use of a CVT between an engine and a multi-speed transmission.

BACKGROUND OF THE INVENTION

Trucks, particularly heavy duty trucks, commonly employ multiple speed counter-shaft type mechanical transmissions having up to at least 18 different torque multiplication ratios. The large number of ratios is needed to enable a fully loaded truck to perform a variety of necessary tasks, including low speed maneuvering in forward and reverse gears as required for moving about freight yards and for loading and unloading tasks, accelerating from a dead stop, accelerating while rolling, maintaining speed while on a grade, and so on. The large number of gears means that there is a frequent need for shifting. Manual gear shifting, as well as the selection of the correct gear, are tasks which require considerable operator experience to consistently execute optimally. Increasingly, transmissions for heavy-duty trucks are being automated. However, even with a large number of ratios, and automated shifting, the engine speed varies with the speed of the vehicle when the vehicle is in a given gear ratio. This means that the engine's operating parameters must be compromised to accommodate the anticipated range of engine operating speeds. An engine that could be tuned to operate at a single engine speed could be tuned to operate much more efficiently. Shifting decreases the operating efficiency of the vehicle, as there can is typically a dip in vehicle speed during the shift when the engine is momentarily disconnected from the drive wheels, and a subsequent need to bring the vehicle back to its target speed.

It is desired to provide a transmission which provides a full ratio coverage, yet minimizes the need for shifting. It is also desirable to provide the engine with a narrower anticipated speed operating range so as to permit the optimization of engine parameters. One of the limitations to the use of CVTs has been their limited torque capacity. One approach to dealing with the relatively low torque capacity of CVTs is to reduce the torque sustained by the CVTs. This has been achieved by splitting the drive torque from the engine into two components, with only part of the torque going through the CVT. A planetary system is commonly used to recombine the CVT and direct torques. The result of such a power splitting arrangement is that, while it provides a relatively high torque capacity CVT system, that system has a relatively narrow torque multiplication ratio band. The narrow ratio concern has been overcome by combining the CVT power splitting system with a multi-step ratio transmission. One such system is illustrated in U.S. Pat. No. 5,167,591, the teachings of which are hereby included by reference. It illustrates the use of a torque splitting planetary arrangement in combination with a stepped transmission. However, given the high torque outputs of engines used for heavy duty trucks, and the limited torque capacities of know CVT systems, particularly CVT belt-type systems, further torque reduction was necessary. It is also desired to provide a compact packaging arrangement for such a system.

SUMMARY OF THE INVENTION

The inventive system beneficially reduces the need for shifting by using the CVT to expand the operating range of each of the stepped gears in the automated gear unit. This is achieved in spite of the limited torque capacity of the CVT by subjecting the CVT to only a portion of the high torque levels of the engine. A step-down gear set reduces the torque passing through the CVT, and then passing the torque from the CVT through a step-up gear set which restores the torque. The CVT is further protected by splitting the torque from the engine, and recombining in a planetary gear set. The planetary gear set serves to mix or combine the direct torque element from the engine with the torque from the CVT.

A continuously variable transmission for use with motor vehicles includes and electronic control unit, and automated gear unit, a variator, an input gear set, an input fixed ratio element and an output fixed ratio element. The electronic control unit is configured to include logic rules for controlling a transmission, the logic rules including issuing transmission control commands. The automated gear unit has gears providing a plurality of selectively engaged gear ratios and engages one of the plurality of gear ratios responsive to commands from the electronic control unit to do so. The gear unit has a gear unit input shaft and a gear unit output shaft. The variator has a variator input shaft and a variator output shaft. The variator is configured to continuously vary a ratio of input torque to output torque between the variator shafts responsive to commands from the electronic control unit. The variator output shaft is drivingly connected to the gear unit input shaft. The input gear set is drivingly connected to the variator input shaft. The input fixed ratio element is configured to reduce the torque from the input gear set to the variator and is operably disposed between the input gear set and the variator input shaft. The output fixed ratio element is configured to increase the torque from the variator and is operably disposed between the variator output shaft and the gear unit input shaft.

A continuously variable transmission for use with motor vehicles includes and electronic control unit, and automated gear unit, a variator, and a planetary mixer gear set. The electronic control unit is configured to include logic rules for controlling a transmission, the logic rules including issuing transmission control commands. The automated gear unit has gears providing a plurality of selectively engaged gear ratios and engages one of the plurality of gear ratios responsive to commands from the electronic control unit to do so. The gear unit has a gear unit input shaft and a gear unit output shaft. The variator has a variator input shaft and a variator output shaft and is configured to continuously vary a ratio of input torque to output torque between the variator shafts responsive to commands from the electronic control unit. The planetary mixer gear set includes a ring gear and a sun gear and a carrier. The carrier retains a plurality of planet gears with the planet gears disposed between the ring gear and the sun gear. The ring gear is fixed to a mixer input shaft. The sun gear is drivingly connected to the variator output shaft. The carrier is fixed to a mixer output shaft which is drivingly connected to the automated gear unit input shaft.

DETAILED DESCRIPTION

Figure 1:
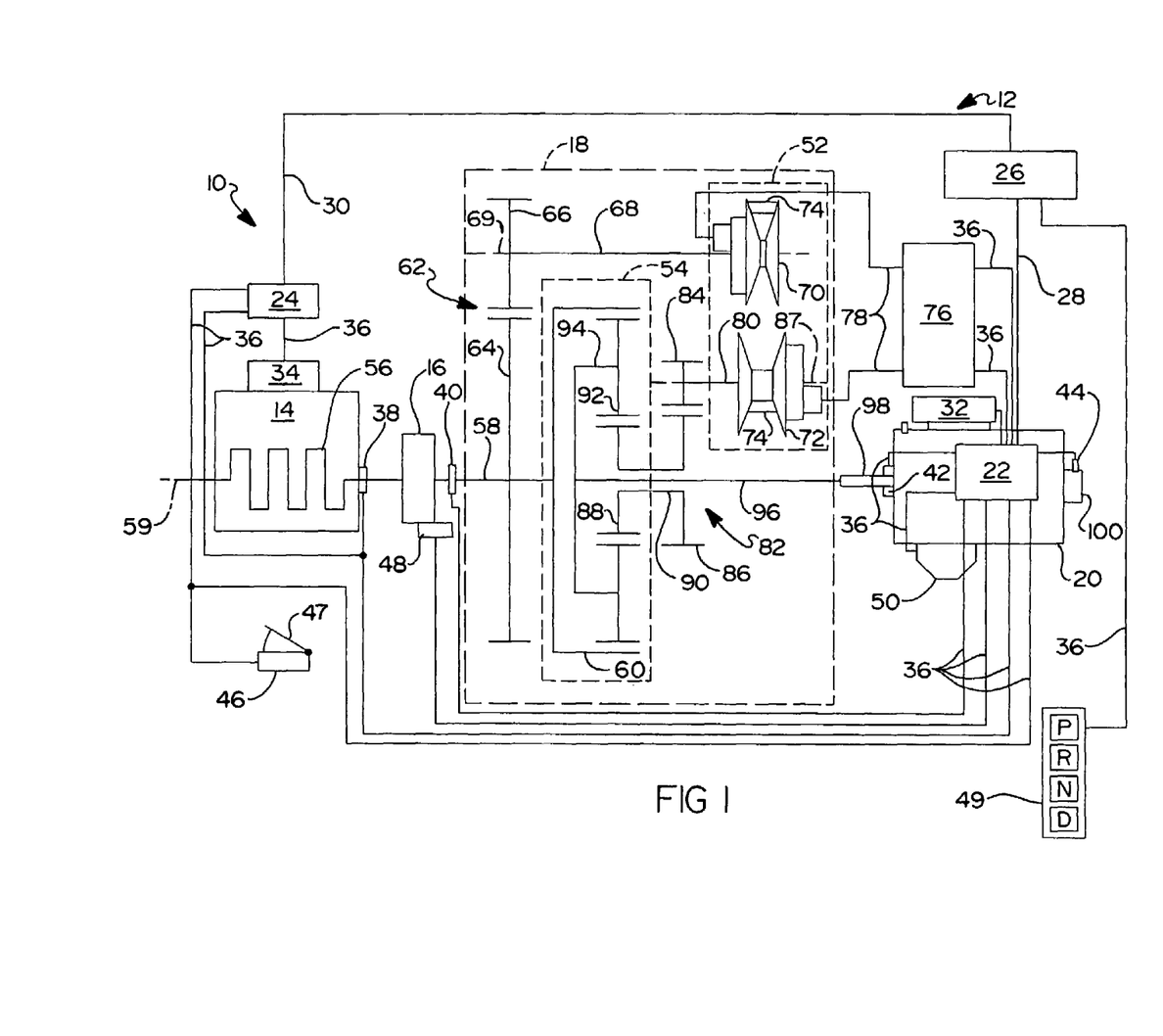
FIG. 1 is a schematic diagram of a drivetrain system including an engine, a CVT and a stepped transmission.

Referring to FIG. 1, a vehicle drivetrain 10 including a continuously variable transmission 12 and an electronically controlled internal combustion engine 14 is illustrated. Continuously variable transmission 12 is connected with engine 14 by a normally engaged master friction master clutch 16. Transmission 12 includes a CVT module 18 and an automated counter-shaft type mechanical transmission gear unit 20.

Figure 2:
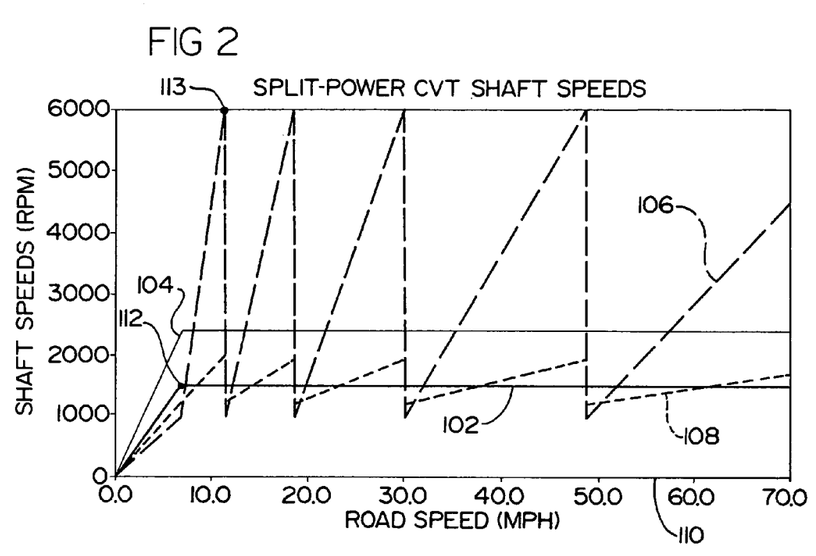
FIG. 2 is a plurality of superimposed plots of various operating parameters of the inventive drivetrain system illustrating a first set of transmission characteristics.

An exemplary gear unit 20 is of the type sold by Eaton Corporation, the assignee of this invention, under the name AutoShift®. A seven speed model (Model numbers TO-11607-ASX and TO-14607-ASX) is used as one exemplary embodiment of gear unit 20. Units or transmissions such as exemplary unit 20 are well known in the prior art and may be appreciated by reference to U.S. Pat. Nos. 3,105,395, 3,283,613 and 4,754,665, the disclosures of which are incorporated by reference. It should be appreciated that any transmission featuring a plurality of fixed gear ratios and automatic shifting and having the necessary torque capacity is suited for use in place of the described exemplary gear unit 20. For example, the plots of FIG. 2 are based on a conceptual five speed transmission. Conceivably, units employing more or fewer gear ratios could be employed, depending on the torque and speed requirements of the vehicle. However, regardless of the configuration of the gear unit selected, the gear unit selected must have fixed gear ratios compatible with the ratio range of the CVT module 18 as will be described in more detail below.

Transmission 12 and engine 14 each have an electronic control unit (ECU) 22 and 24 respectively. ECUs 22 and 24 communicate with each other and a system ECU 26 over multiplexed data buses 28 and 30. Bus 28 is disposed between system ECU 26 and transmission ECU 22. Bus 30 is disposed between system ECU 26 and engine ECU 24. ECUs 22, 24 and 26 may be of the type illustrated in U.S. Pat. No. 4,595,986, the disclosure of which is incorporated herein by reference. The ECUs are effective to process the inputs from a variety of sensors discussed in more detail below in accordance with predetermined logic rules, to issue command output signals to the other ECUs and to a transmission shift controller 32 and an engine controller 34 and/or to a display unit and/or to other systems. Engine controller 34 controls, among other parameters, engine fueling. The data buses 28, 30 conform to an appropriate industry standard communications protocol for data links such as SAE J-1922, SAE J-1939, ISO 11898, ISO 11783 or the like.

Information indicative of engine torque, engine speed and transmission output shaft speed will be carried to the ECUs 22 and 24 by conductors 36 disposed between a plurality of sensors and the ECUs. The sensors include an engine crankshaft speed sensor 38, a CVT module input shaft speed sensor 40, a CVT module output shaft speed and gear unit input shaft speed sensor 42, a gear unit output shaft sensor 44, a position sensor 46 for a fuel pedal 47, a master friction clutch position sensor and various engine and transmission parameter sensors. Conductors 36 also communicate command signals to the various system controls and actuators including gear unit shift controller 32, engine controller 34 and a master friction clutch actuator 48. The master friction clutch sensor is, in the exemplary embodiment, integrated into actuator 48, but may be separate from actuator 48. As controllers 32 and 34 and actuator 48 typically comprise portions of closed loop systems, provisions may be made for conductors 36 to handle both for control signals and feedback signals. Alternatively, separate conductors, not shown, may be provided. Further, controllers 32 and 34 may also include integral position sensors as may be needed.

Clutch actuator 48 controls master clutch 16 responsive to control signals from transmission ECU 22. Such systems are well known. See U.S. Pat. Nos. 4,081,065 and 4,361,060, the disclosures of which are incorporated herein by reference. Alternatively, master clutch 16 may be a centrifugal clutch of the type disclosed in U.S. Pat. No. 6,502,476 not requiring an actuator, the disclosures of which are incorporated herein by reference. Master clutch 16 need not be disengaged for each shift. Fuel modulation, as disclosed in U.S. Pat. No. 4,850,236, may be utilized for shifting gear unit 20 without releasing the master clutch.

A shift selector 49 allows the vehicle driver to select a mode of operation and provides a signal indicative of the selected mode. Possible modes include Park, Reverse, Neutral, and Drive. Shift selector 49 includes a plurality of gear range buttons, which may be selected by the vehicle operator. Shift selector 49 could take other forms not shown, such as a conventional automatic transmission shift lever which moves in a fore-aft direction between positions corresponding to gear ranges.

An input shaft brake 50 is mounted to transmission gear unit 20 and facilitates quicker upshifting as is well known in the prior art. Input shaft brake 50 is responsive to control signals from transmission ECU 22.

CVT module 18 has as its principal elements a variator 52 and a planetary mixer or gear set 54. Engine crankshaft 56 of engine 14 is selectively drivingly connected by master friction clutch 16 to a CVT module input shaft 58 or mixer input shaft 58. Input shaft 58 rotates about a first axis of rotation 59 on which it is centered. A ring gear 60 is fixed to input shaft 58. A variator input gear set 62 drivingly connects input shaft 58 with variator 52. Input gear set 62 includes an input drive gear 64 fixed to input shaft 58 and an input driven gear 66 fixed to a variator input shaft 68. Input shaft 68 is rotatably fixed to a first variator pulley 70 for unitary rotation therewith. Gear 66, shaft 68 and pulley 70 are centered on and rotate about a second axis of rotation 69 which is parallel to but offset from first axis 59.

First variator pulley 70 is drivingly connected to a second variator pulley 72 by a drive belt or chain 74. Drive chain 74 in a preferred embodiment is of the type employed in the Multitronic™ continuously variable transmission in the Audi A6@ car. The Multitronic™ transmission employs pulleys, chain, and hydraulic pulley controls supplied by LuK Lamellen und Kupplungbau GmbH of Germany (LuK) and its subsidiaries and affiliates. Such elements are taught and described in U.S. Pat. Nos. 5,169,365; 5,201,687; 5,217,412; 5,295,915; 5,538,481; 5,667,448; 5,725,447; 6,017,286; 6,068,565; 6,123,634; 6,129,188; 6,171,207; 6,174,253; 6,186,917; 6,190,274; 6,234,925; 6,270,436; 6,293,887; 6,322,466; 6,336,878; 6,336,880; 6,346,058; 6,358,167; 6,358,181; 6,361,456; 6,361,470 and 6,416,433, all of which are owned by LuK or its affiliates or subsidiaries, the disclosures of which are included herein by reference. Pulleys 70 and 72 each have facing conical flanges which can be selectively axially moved toward and away from each other. The radius of engagement between the chain and the pulleys is determined by the distance between the flanges. The closer the flanges are to each other, the larger the effective pulley diameter is. Because the length of chain 74 and the center-to-center distance of pulleys 70 and 72 are fixed, changes in the effective pulley diameter of one pulley must be co-ordinated with changes in the effective pulley diameter of the other pulley. While pulleys 70 and 72 are shown as being of equal size, they need not be, particularly if it is seen as advantageous to operate principally in either the overdrive mode or the underdrive mode. The displacement of the flanges is ultimately controlled by command signals from the transmission ECU 22. It is to be appreciated that the type of variator 52 employed is exemplary only. Alternative types of variators which may be employed include other types of variable diameter belt and pulley variators, pump/motor variators, toroidal type variators, and all other mechanisms capable of suitably varying torque and speed on a continuous basis.

The overall ratio range provided by one embodiment of pulleys 70 and 72 is approximately 6:1. In doing so, pulley 70 and 72 provide both an underdrive condition with a torque multiplication factor of about 2.45:1, and an overdrive condition with a torque multiplication of about 1:2.45. In the direct condition, with both pulleys 70 and 72 having the same effective pulley diameter, the torque multiplication factor is 1:1. The underdrive condition is achieved with pulley 70 in a minimum diameter condition in which the flanges of pulley 70 are spread relatively far apart and pulley 72 in a maximum diameter condition in which the flanges of pulley 72 are pushed relatively close together. The overdrive condition is achieved with pulley 70 in a maximum diameter condition in which the flanges of pulley 70 are pushed relatively closed together and pulley 72 in a minimum diameter condition in which the flanges of pulley 72 are spread relatively far apart.

A hydraulic controller 76 is employed to translate the electronic control signals from ECU 22 transmitted via conductors 36 into pressurized hydraulic fluid passing through hydraulic connecting channels 78. Pressurized hydraulic fluid from hydraulic controller 76 mechanically displaces the flanges. It should be appreciated that alternative means of displacing the flanges, such as electric motors, may be employed.

A variator output shaft 80 connects second variator pulley 72 with a variator output gear set 82. Output gear set 82 includes an output drive gear 84 and an output driven gear 86. Shaft 80, pulley 72 and drive gear 84 all rotate about a third axis of rotation 87 which is parallel to but offset from both first and second axes of rotation 59 and 69. The functions provided by gear sets 62 and 82 may alternatively be provided by any other fixed ratio mechanism, such as sprocket and chain combinations, belts and pulleys or any other suitable mechanism. Output driven gear 86 is drivingly connected to a sun gear 88 of planetary mixer 54 by a connecting hub 90. At least two planet gears 92 are disposed between sun gear 88 and ring gear 60. A carrier 94 on which planet gears 92 are rotatably mounted connect planet gears 92.

A CVT module output shaft 96 or mixer output shaft 96 is rotatably fixed to or is unitary with a gear unit input shaft 98 for rotation about axis 59. Hub 90 and gears 86 and 88 circumscribe shaft 96, and also rotate about axis 59. A gear unit output shaft 100 extends from gear unit 20 for connection to a drive axle (not shown) or an intermediate drive shaft (not shown). The relative rate of rotation between input shaft 98 and output shaft 100 is determined by the gear selected within gear unit 20. Planetary gear set 54 beneficially provides a greater diminution of torque transferred through variator 52 by having ring gear 60 driven by input shaft 58 and having sun gear 86 driven by variator 52 and having carrier 94 drive output shaft 96.

The continuously variable transmission 12 operates in the following manner. The driver first selects a desired mode of operation using the shift selector 49. The Drive mode is selected to provide forward motion. The selection is preferably made with the vehicle in a stopped condition. The vehicle is equipped with a brake pedal (not shown) as well as fuel pedal 47. The brake pedal, when depressed, actuates the vehicle brakes which help maintain the vehicle in a stopped condition, and also bring the vehicle, when it is moving, to a stop. In the stopped condition, the vehicle operator may have his foot resting on the brake. To accelerate the vehicle, the vehicle operator moves his right foot to the fuel pedal 47 and depresses it. Controller 22 commands the engagement of master friction clutch 16. Torque from engine 14 is transferred through clutch 16 to input shaft 58. The torque is then split into two components, with a first part being transferred to ring gear 60 and a second part to variator 52 via gear set 62. The sum of the torque transmitted by drive gear 64 and ring gear 60 equals the torque transmitted by clutch 16. The torque from gear 64 is further reduced by the ratio of gear set 62 before reaching variator 52. Reducing the torque to the variator 52 by first splitting it with the planetary gear set 54, and further stepping down torque with gear set 62, and then stepping up the torque from the variator with second gear set 82, beneficially allows the use of a relatively low torque capacity variator to enable operation of a vehicle across a wide range of road speeds at a constant engine speed. The variator, in an underdrive condition, multiplies the torque. Torque from the variator 52 is again increased by the ratio of gear set 82, and transferred to sun gear 88. The combined torque of sun gear 88 and ring gear 60 is transferred to carrier 94 through planet gears 92. It is the torque of carrier 94 which is communicated to input shaft 98. Gear unit 20 multiples the torque by the ratio of the selected gear to generate the final output torque at output shaft 100.

To start the vehicle moving, variator 52 has the flanges of the first variator pulley 70 spread relatively far apart and the flanges of the second variator pulley 72 pushed relatively close together to provide a maximum variator torque multiplication. Gear unit 20 is in first gear, providing the maximum gear unit torque multiplication of the engine torque transmitted by clutch 16. Together, variator 52 and gear unit 20 provide the necessary torque multiplication between engine 14 and shaft 100 to initiate vehicle movement.

FIG. 2 shows the relationship between the rotational speed of engine 14 and the rotational speed of various rotating components across a range of vehicle speeds. As used here, the word speed, when used in the context of rotating shafts or elements, refers to the rotational speed of the shaft or element. Engine speed means the rotational speed of engine crankshaft 56. It is to be appreciated that a speed 102 of input shaft 58 equals the engine speed so long as clutch 16 is engaged.

Initially, with gear unit 20 in first gear, first gear providing the greatest amount of torque multiplication of the available forward gears, and with variator 52 providing the maximum amount of torque multiplication within its capability, the speed 102 of input shaft speed 58, the speed 104 of variator input shaft 68, the speed 106 of variator output shaft 80, and the speed 108 of CVT module output shaft 96 all increase linearly with vehicle speed 110 as the vehicle accelerates. However, that changes when input shaft speed 102 reaches an optimal engine speed 112. At optimal engine speed 112, input shaft speed 102 plateaus or holds steady. When input shaft speed 102 plateaus, an acceleration of the CVT module output shaft 96, and hence of the vehicle, is maintained by varying the ratio of the variator 52.

Variator input shaft speed 104, which equals input shaft speed 102 multiplied by the ratio of gear set 62, plateaus when input shaft speed 102 plateaus. In the embodiment of FIG. 2, the ratio of gear set 62 is approximately 1.6, with the speed of shaft 68 being 60% greater than that of shaft 58, and the torque transferred from shaft 58 to shaft 68 being conversely reduced.

Transmission ECU 22 initiates adjust of the diameters of pulleys 70 and 72 at the initiation of the plateau so as to maintain acceleration. Pulley 70, rotating at variator input shaft speed 104, increases in diameter as pulley 72 decreases in diameter, increasing the speed of pulley 72. The speed of pulley 72 is decreased, while the torque is correspondingly increased, by transmitting it through variator output gear set 82. In the example of FIG. 2, the ratio of gear set 82 is approximately 0.50:1, with the speed of hub 90 and sun gear 88 being half the speed of variator output shaft speed 106.

The increase in the speed of sun gear 88 increases the speed at which planet gears 92, and hence carrier 94, rotate around axis 59. When ring gear 60 and sun gear 88 are rotating at the same speed, then carrier 94 will rotate in unison with gears 60 and 88. When the sun gear 88 is rotating slower than ring gear 60, carrier 94 will rotate slower than ring gear 60, but faster than sun gear 88. When sun gear 88 is rotating faster than ring gear 60, carrier 94 will rotate faster than ring gear 60.

The relative contribution of the change in speed of the sun gear 88 to the change in speed of the carrier 94 depends on the relative diameters of sun gear 88 and ring gear 60 according to the equation:

$$\theta_C = (r_R \theta_R + r_S \theta_S)/(r_R + r_S)$$

where $\theta_C$ is the rotational speed of the carrier 94;

$r_R$ is the radius of ring gear 60;

$\theta_R$ is the rotational speed of ring gear 60;

$r_S$ is the radius of sun gear 88; and $\theta_S$ is the rotational speed of sun gear 88.

In the example of FIG. 2, the ratio of the radius of the ring gear to the radius of the sun gear, $(r_R/r_S)$ equals 2.5.

As variator 52 transitions from a maximum underdrive condition to a maximum overdrive condition, variator output shaft speed 106 climbs from a low point of approximately 1000 RPM to a high point of approximately 6000 RPM, and CVT module output shaft speed 108 from approximately 1200 to approximately 1900. When a high point 113 is reached, and variator 52 is in its maximum overdrive condition, a shift is made within gear unit 20 to a second gear. With the shift to second gear, variator output shaft speed 106 is dropped back to about 1000 RPM and CVT module output shaft speed 108 to about 1200 RPM. The variator then starts its task anew, going from maximum underdrive to maximum overdrive. This is repeated in third, fourth and fifth gears if necessary, until the vehicle is at its desired operating speed.

The gear ratios of gear unit 20 must be matched with the range of variator 52, taking into consideration the ratios of gear sets 62, 82 and 54. For the ideal transmission of FIG. 2, gear unit ratios are of even steps of approximately 60%, providing coverage compatible with that provided by the variator.

In another exemplary embodiment, an 18 speed geared transmission which would employ 17 shifts or steps of approximately 18% and ranging from 17% to 22% to provide a total ratio range from 12.19:1 at the low end to 0.73:1 at the high end can be replaced with a six speed gear unit 20 or transmission coupled with a CVT module 18 providing a 60% range. The six speed transmission with steps of approximately 60%, in combination with a CVT module, provides the same ratio coverage as the 18 speed transmission. A transmission having gear ratios would be 10.48, 6.55, 4.10, 2.56, 1.60, and 1.0 would, with the CVT module providing a 60% range, provide a total ratio range from 13.26 to 79. If the gearing is selected to support a 100% range from the CVT module 18, then a four speed gear unit 20 could be employed, with the gears providing steps of 100% and the CVT module handling the speed increases between the gears, as well as underdrive below first gear and overdrive beyond fourth gear. Gear ratios would be approximately 8.00, 4.00, 2.00 and 1.00.

Changing gears must be executed with care so as to minimize any loss of energy and of speed during shifting. FIG. 2 is idealized and somewhat unrealistic in that it does not make allowances for the possibility of vehicle speed drop off during shifting. Alternative methods of achieving the necessary torque release within the drivetrain 10 are available. With one such method, master friction clutch 16 is released to permit shifting of gear unit 20 by controller 32 to a neutral condition, much as a vehicle operator would employ a clutch pedal to release torque when shifting. An alternative means of breaking torque is to manipulate engine fueling by methods well known in the art and analogous to manually executed clutchless or float shifting. With the clutchless method, a command from transmission ECU 22 directs engine ECU 24 to in turn issue a zero torque command to controller 34, and to, if necessary, provide torque pulses to ensure a torque level sufficiently low to permit gear disengagement. Once torque is broken, and gear unit 20 is in neutral, synchronization must be achieved to complete the shift. Distinct from the prior art which relied on either manipulating engine speed or changing the speed of the input shaft 98, the present invention uses variator 52 to adjust the input shaft to a synchronous speed while the engine and input shaft speed are maintained at the optimal target level 112. Input shaft brake 50 can potentially be employed to assist the variator 52 in slowing the input shaft and the elements rotating therewith in an upshift.

Figure 3:
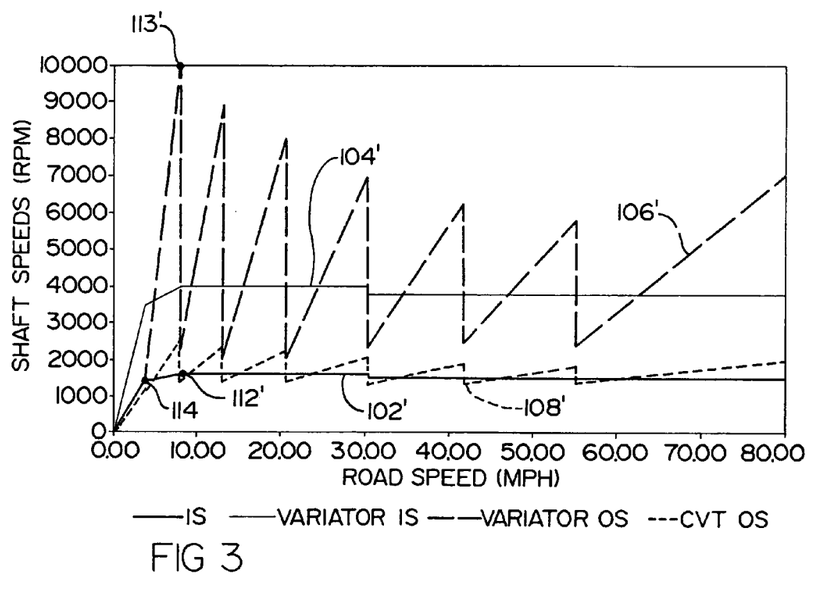
FIG. 3 is a plurality of superimposed plots of various operating parameters of the inventive drivetrain system illustrating a second set of transmission characteristics.

FIG. 3 plots illustrate a more accurate portrayal of a drivetrain system 10 operating within the limitations of available components. The drivetrain system of FIG. 3 is configured to compensate, if necessary, for a drop-off in vehicle speed that can potentially occur during the shift. In that system, a unit having the characteristics of the exemplary Eaton AutoShift transmission discussed above are employed.

Gear unit 20, if configured consistent with the characteristics of FIG. 3, has gear ratios of, first through seventh, 9.24, 5.35, 3.22, 2.04, 1.37, 1.0 and 0.75. These ratios yield between-gear-steps of 73%, 66%, 58%, 49%, 37% and 33%. If even steps were employed, they would all be 52%. Instead the steps are arranged in a gathered ratios fashion from 73% to 33%. As a result, the usable vehicle velocity range for a single gear ratio of gear unit 20' changes less from gear to gear than it would if uniform gear steps were employed. The gathered ratio steps space out or separate the shift points of the gear unit more uniformly or regularly than would constant steps. As a consequence of the graduated changes in steps, less of the variator range would be employed in the upper gears, as evidenced by the decreasing top speed of variator output shaft speed 106'. Variator output shaft speed in gear seven increases beyond that achieved in earlier gears, as there are no additional gears to shift into. The vehicle's maximum road speed, at the point of maximum variator overdrive, would be approximately 95 miles per hour (150 kilometers per hour). Higher vehicle speeds could only be obtained if engine speed and input shaft speed 102' are permitted to increase beyond 112'. Also, at higher vehicle speeds, the variator is operated over a narrower range of speeds than at lower vehicle speeds, as is evident from FIG. 3.

FIG. 3 also differs from FIG. 2 in that input shaft speed is not held constant after its initial steep climb from zero. The period between points 114 and 112' indicates that input shaft speed continues to increase after the initiation of variator adjustment, and has no real equivalent in FIG. 2. While input shaft speed 102' and variator output shaft speed 106' overlap, it is only by coincidence, based on the variator input gear ratio, and the planetary gear ratios that this occurs. CVT output shaft speed 108' exhibits a slight discontinuity approximately coincident with point 114. This may be attributable to the input shaft speed 102' dropping just before the initiation of variator adjustment. The speed multiplication ratio of gear set 62 is 2.5:1, with variator input shaft speed 104' being 4000 RPM when input shaft speed 102' is 2500 RPM. The speed multiplication ratio provided by the variator output gear set 82 is the 0.4:1, the reciprocal of the ratio provided by the variator input gear set 62. The ratio of the radius of the ring gear $r_R$ to the radius of the sun gear $r_S$ is 1.5:1. The gear unit ratios are 9.24, 5.35, 3.22, 2.04, 1.37, 1.0 and 0.75. Together, with the CVT module 18, possible ratios ranging from 11.09 to 0.50, with an overall 23:1 spread, are provided.

Another difference is after the shift into the fifth gear ratio where input shaft speed 102' and variator input shaft speed 104' take slight dips. This reflects the reduced need for torque at the higher speeds under steady state driving conditions.

The drivetrain 10 modeled by FIG. 3 employs a variator having an overall ratio range of 6:1 and providing an underdrive torque multiplication ratio of 2.45:1 and an overdrive torque multiplication of 1:2.45. It is apparent from the plot of speed 106' that the full range of variator 52 is not being employed. While substantially all of the overdrive range is being used in first gear to reach point 113', not all of the range is being used on the underdrive side at the start of second gear. That provides drivetrain system 10 with a torque reserve available for use upon completion of an upshift. No such provision was made in the arrangement of FIG. 2. This advantageously accommodates maintaining constant engine speed even with the occurrence of a slight drop in vehicle speed as might occur when shifting on an uphill grade. The other upshifts in FIG. 3 maintain a similar reserve. The system has an abundance of low end torque capacity. It is possible to initiate vehicle movement with the gear unit is second gear, with no need to make the shift to third gear until a vehicle velocity of 13 miles per hour (21 kilometers per hour) is reached. Similarly, on the overdrive side, the variator 52 does not employ the full range available. The ratios used by the variator after first gear, and in the upper level gears in particular, are significantly less than the maximum available ratio of 1:2.45.

FIGS. 4–11 provide detailed perspective illustrations of a CVT module 18' mounted to a gear unit 20'. CVT module 18' is integrated into a clutch housing 116. A clutch friction disc, not shown, would be disposed over CVT module input shaft 58'.

Figure 4:
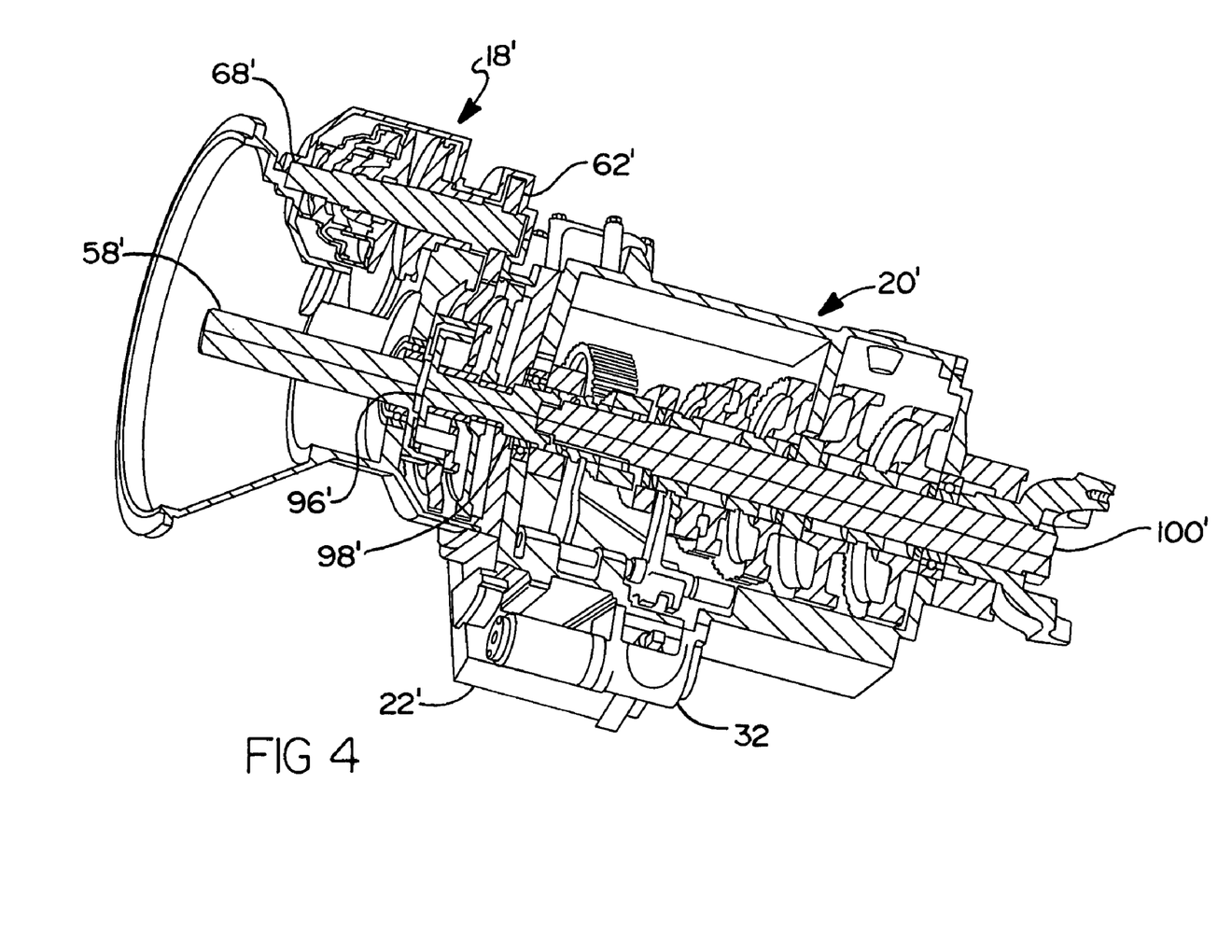
FIG. 4 is a combined perspective and sectional view of a CVT module joined to a gear unit.

The combined CVT module 18' and gear unit 20' of FIG. 4 is oriented so that CVT module 18' is to the left of gear unit 20'. The image of FIG. 4 is upside down relative to the image of FIG. 1, with controller 32 being on the bottom in FIG. 4. Typically, controller 32 would be toward the top. Transmission ECU 22' is on the far side of gear unit 20'. CVT module input shaft 58', a combined CVT module output shaft and gear unit input shaft 96' and 98' and a gear unit output shaft 100' are all concentrically located on first axis of rotation 59'. Variator input shaft 68', concentrically located on second axis of rotation 69', is parallel to and offset from input shaft 58', and drivingly connected to input shaft 58' by gear set 62'.

Figure 5:
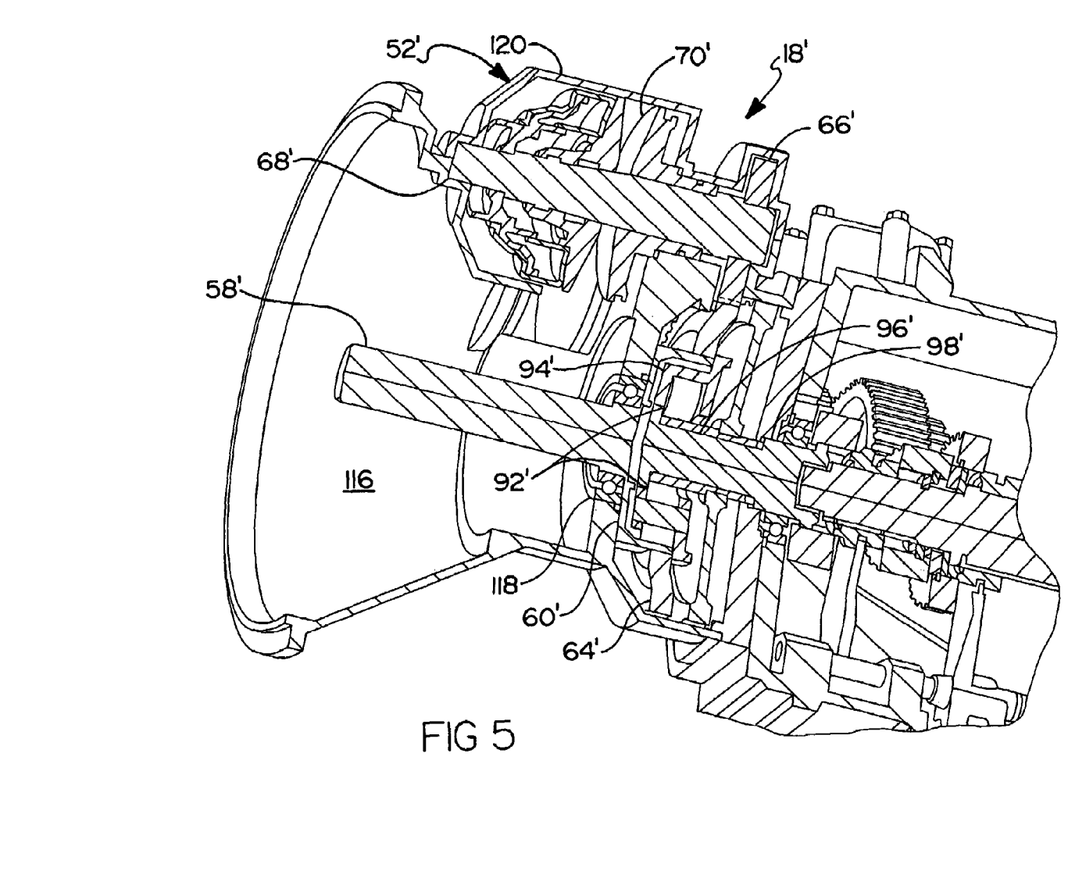
FIG. 5 is an enlarged view of one portion of the CVT module and gear unit of FIG. 4.

As better seen in FIG. 5, input drive gear 64' of input drive gear set 62' is fixed to an outer diameter of ring gear 60'. Shaft 58' is rotatably supported within clutch housing 116 by a ball bearing 118. Driven gear 66' is fixed to shaft 68'. First variator pulley 70' is mounted to shaft 68' with part of the actuating mechanism of the displaceable flange being shown in section. A variator housing 120 combines with clutch housing 116 to enclose variator 52'. Carrier 94 retains planet gears 92'. Carrier is fixed to combined shaft 96' and 98'. This configuration beneficially provides a compact arrangement of the elements of the CVT module 18'.

Figure 6:
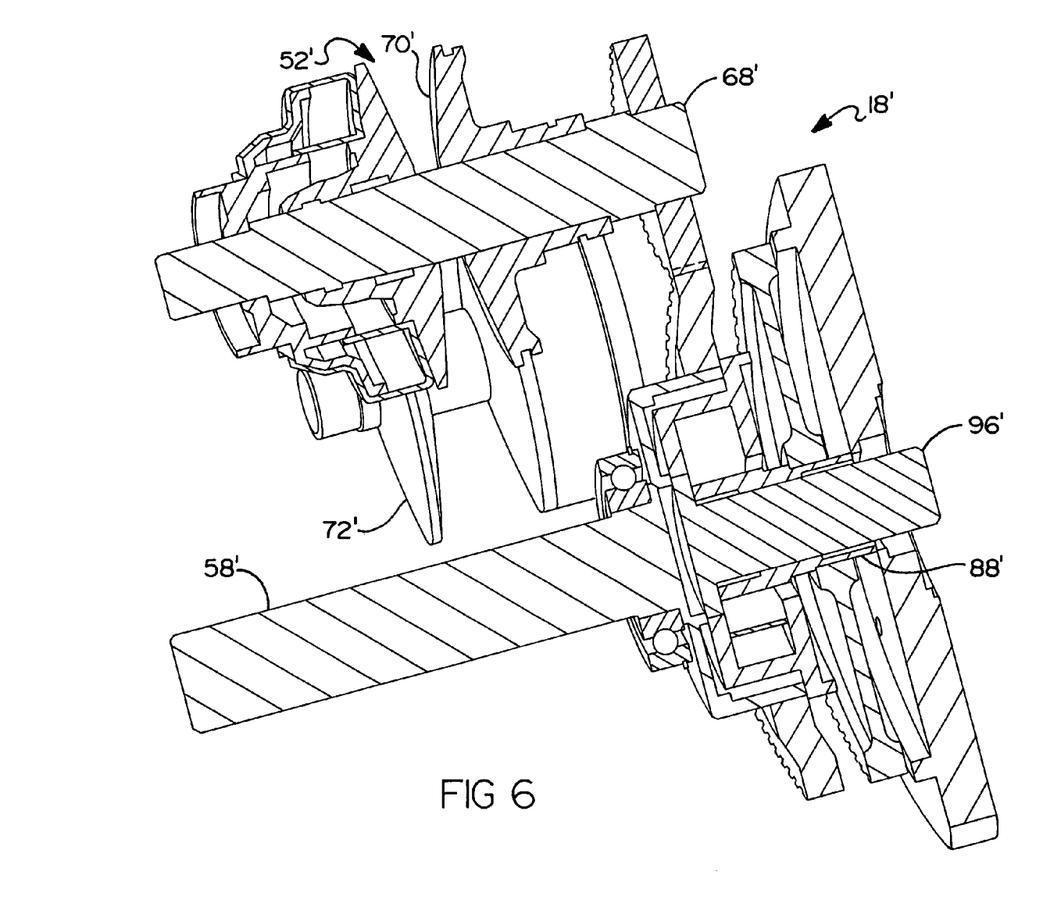
FIG. 6 is a section view of the CVT module of FIG. 4 taken through a first axis and a second axis.
Figure 7:
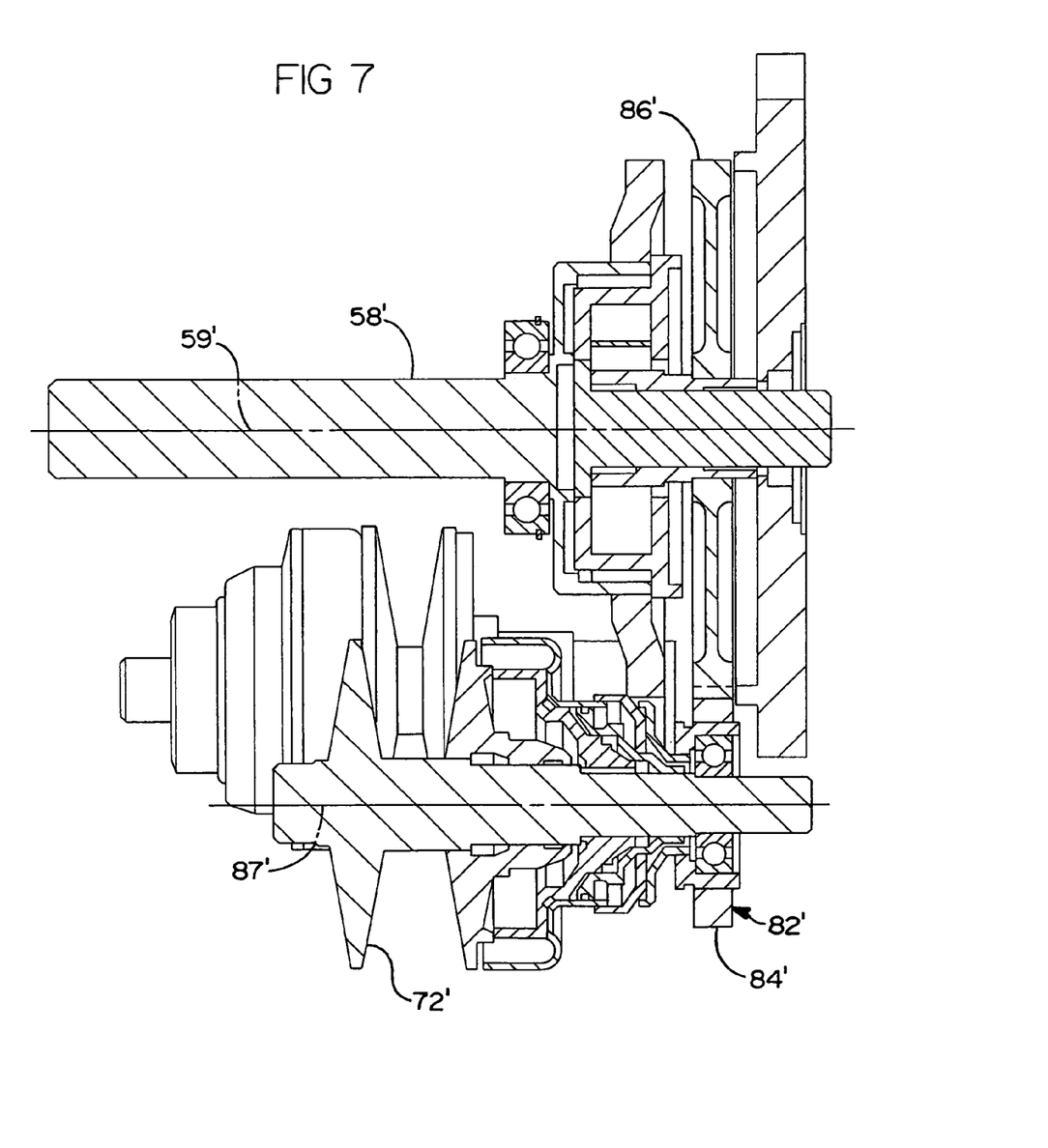
FIG. 7 is a sectional view of the CVT module of FIG. 4 taken through a first axis and a third axis.

FIG. 6 shows the CVT module 58' in much the same orientation as in FIG. 5, but outside of the clutch housing 116. FIG. 7 provides a sectional view of the CVT module 58' taken along first axis 59' and third axis 87'. Second variator pulley 72' is shown in section. Output drive gear set 82' includes output drive gear 84' and output driven gear 86'.

Figure 8:
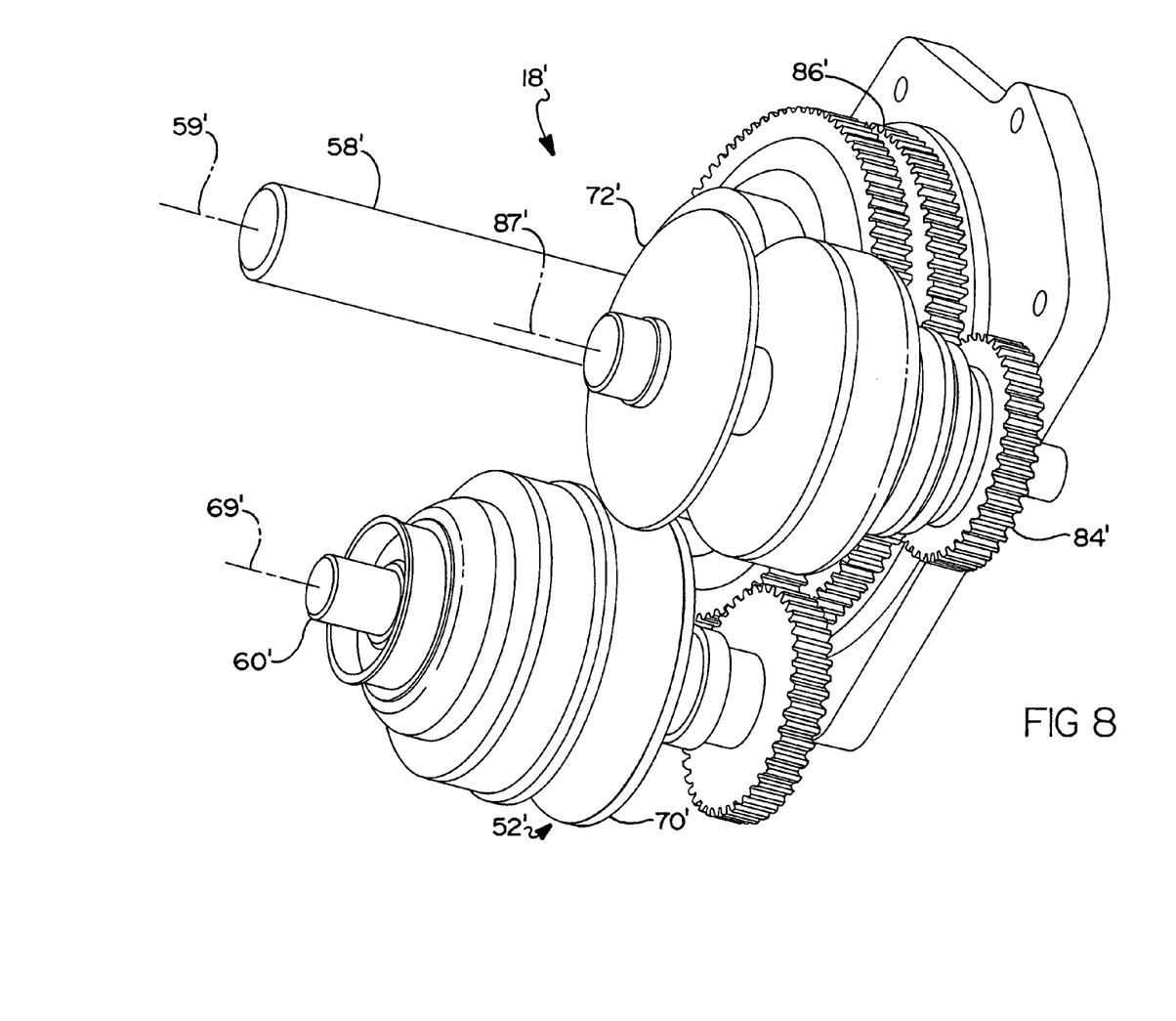
FIG. 8 is a perspective view of the CVT module of FIG. 7.
Figure 9:
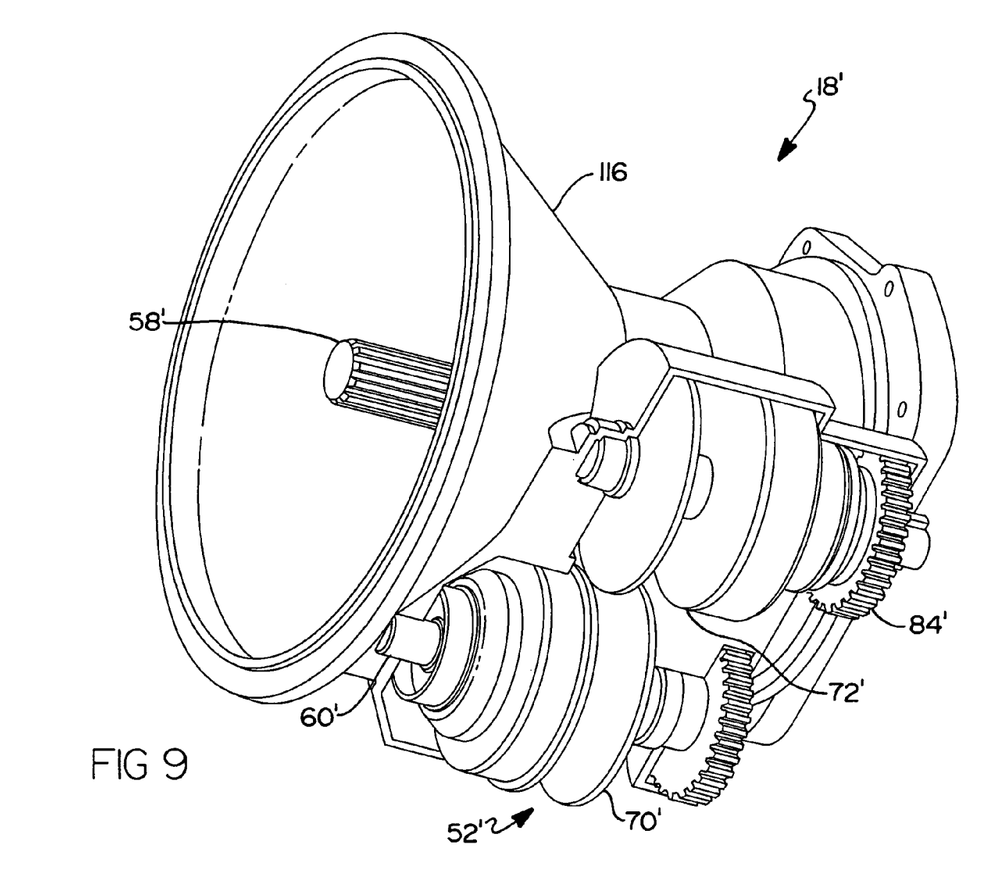
FIG. 9 is a perspective view of the CVT module of FIG. 8 with a clutch housing.
Figure 10:
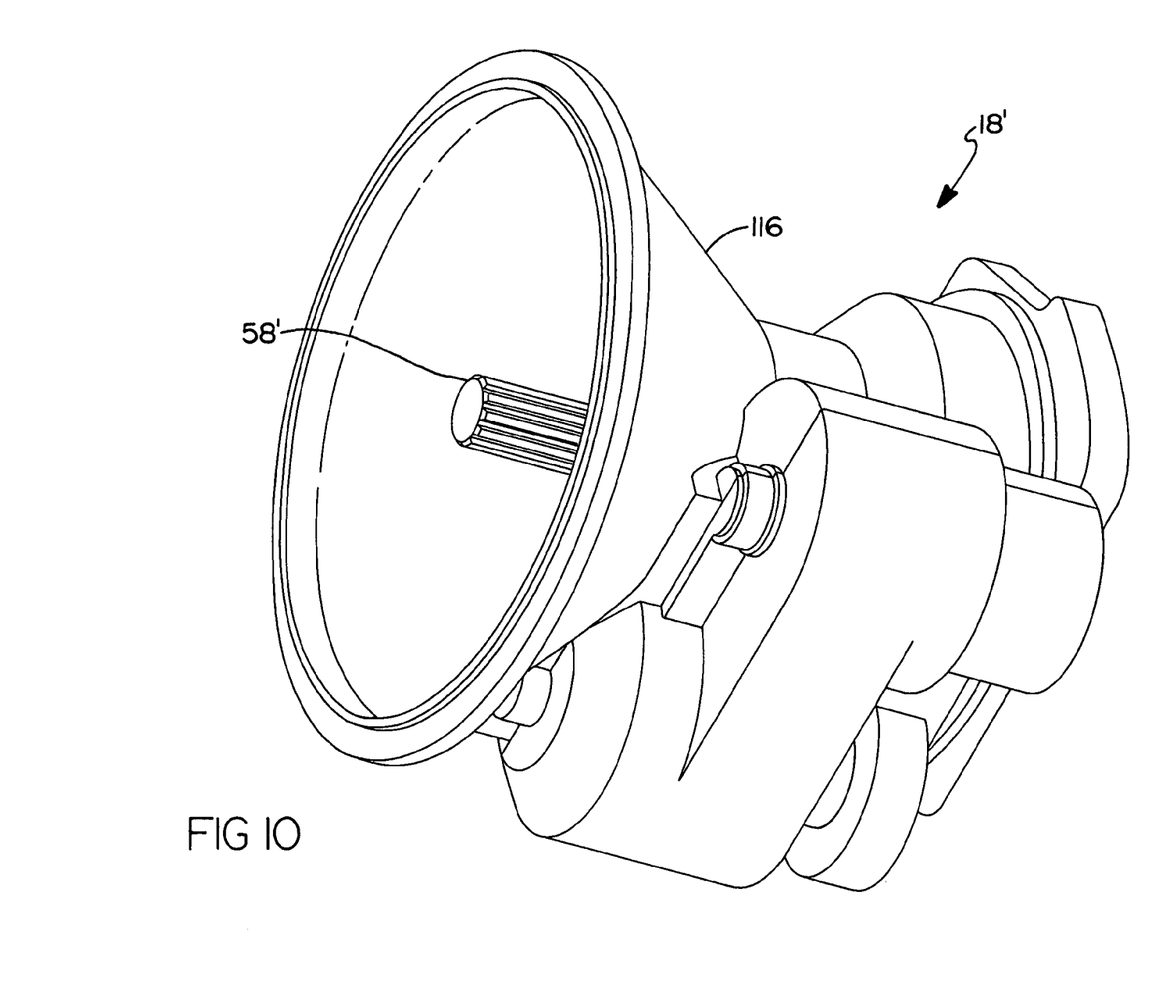
FIG. 10 is a perspective view of the CVT module of FIG. 9 with a variator housing.
Figure 11:
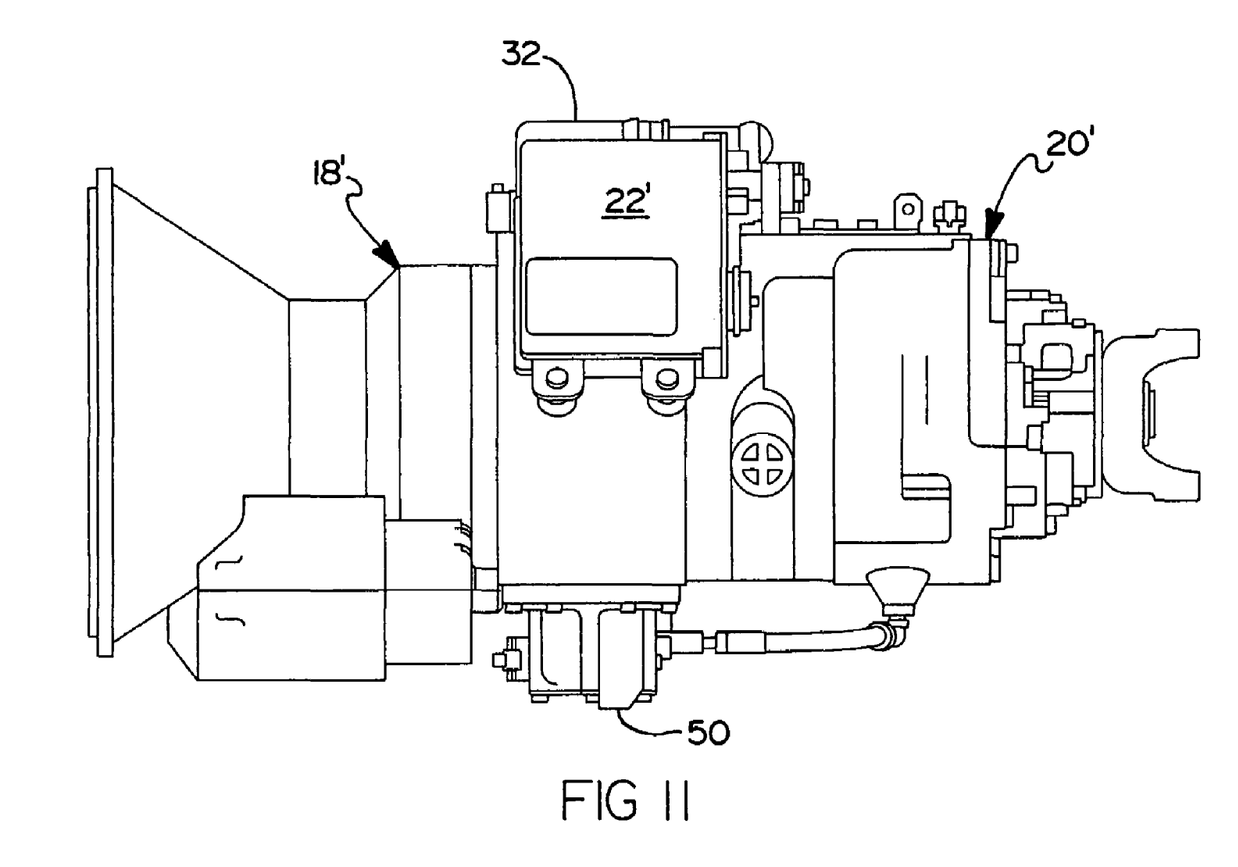
FIG. 11 is an exterior view of a combined CVT module and gear unit assembly.

A perspective view of CVT module 18' is shown from yet another angle in FIG. 8. FIG. 9 shows CVT module 18' in the same orientation as in FIG. 8, with the clutch housing 116 in place. FIG. 10 shows the assembly of FIG. 9 with the variator housing 120 in place. FIG. 11 is an exterior view of the entire CVT module 18' and gear unit 20' assembly.

The present invention is not limited by the preceding description of a specific embodiment of the invention. The scope of the invention is set forth in the claims appended hereto.

I claim:

1. A continuously variable transmission for use with motor vehicles comprising: an electronic control unit configured to include logic rules for controlling a transmission, including issuing transmission control commands; an automated gear unit having gears providing a plurality of selectively engaged gear ratios and engaging one of the plurality of gear ratios responsive to commands from the electronic control unit to do so and the gear unit having a gear unit input shaft and a gear unit output shaft; a variator having a variator input shaft and a variator output shaft and configured to continuously vary a ratio of input torque to output torque between the variator shafts responsive to commands from the electronic control unit, the variator output shaft drivingly connected to the gear unit input shaft; an input gear set drivingly connected to the variator input shaft; an input fixed ratio element configured to reduce the torque from the input gear set to the variator and operably disposed between the input gear set and the variator input shaft; and an output fixed ratio element configured to increase the torque from the variator and operably disposed between the variator output shaft and the gear unit input shaft.

2. A continuously variable transmission as claimed in claim 1 wherein the input gear set is a planetary mixer gear set including a ring gear and a sun gear and a carrier retaining a plurality of planet gears disposed between the ring gear and the sun gear with at least one of the ring gear the sun gear and the carrier drivingly connected to the variator input shaft.

3. A continuously variable transmission as claimed in claim 1 wherein the gear ratios of the automated gear unit are gathered gear ratios.

4. A continuously variable transmission for use with motor vehicles comprising: an electronic control unit configured to include logic rules for controlling a transmission, including issuing transmission control commands; an automated gear unit having gears providing a plurality of selectively engaged gear ratios and engaging one of the plurality of gear ratios responsive to commands from the electronic control unit to do so and the gear unit having a gear unit input shaft and a gear unit output shaft; a variator having a variator input shaft and a variator output shaft and configured to continuously vary a ratio of input torque to output torque between the variator shafts responsive to commands from the electronic control unit; a planetary mixer gear set including a ring gear and a sun gear and a carrier retaining a plurality of planet gears with the planet gears disposed between the ring gear and the sun gear with the ring gear being fixed to a mixer input shaft the sun gear drivingly connected to the variator output shaft and the carrier fixed to a mixer output shaft drivingly connected to the automated gear unit input shaft; an input fixed ratio element configured to reduce the torque from the input gear set to the variator and operably disposed between the mixer input shaft and the variator input shaft; and an output fixed ratio element configured to increase the torque from the variator and operably disposed between the variator output shaft and the sun gear.

* * * * *